W. B. PEARSON & E. R. SEWARD.
COUNTER.
APPLICATION FILED FEB. 13, 1909.
1,027,065.
Patented May 21, 1912.
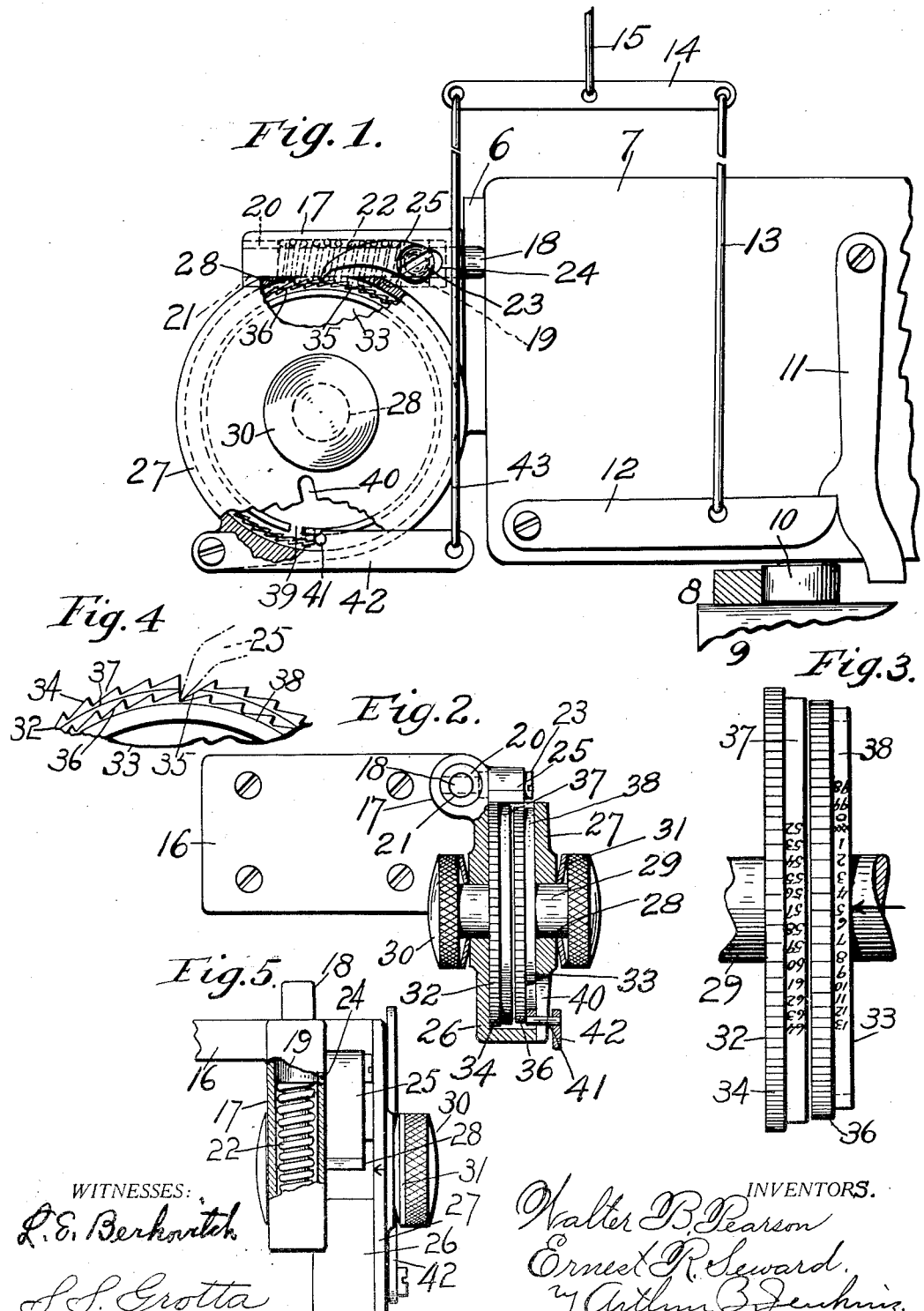
WITNESSES:
L. E. Berkowitch
S. S. Grotta
INVENTORS
Walter B. Pearson
Ernest R. Seward
by Arthur B. Jenkins
ATTORNEY.

UNITED STATES PATENT OFFICE.

WALTER B. PEARSON, OF CHICAGO, ILLINOIS, AND ERNEST R. SEWARD, OF HARTFORD, CONNECTICUT; SAID SEWARD ASSIGNOR TO THE HARTFORD MACHINE SCREW COMPANY, OF HARTFORD, CONNECTICUT, A CORPORATION OF CONNECTICUT.

COUNTER.

1,027,065.  Specification of Letters Patent.  Patented May 21, 1912.

Application filed February 13, 1909. Serial No. 477,812.

*To all whom it may concern:*

Be it known that we, WALTER B. PEARSON and ERNEST R. SEWARD, each a citizen of the United States, and residents, respectively, of Chicago, in the county of Cook and State of Illinois, and Hartford, in the county of Hartford and State of Connecticut, have invented a new and Improved Counter, of which the following is a specification.

Our invention relates to the class of devices by means of which a register is obtained of the operations of a machine or other object, and more especially to that class in which the number of movements of a certain part or parts of a machine or other object may be ascertained at any time.

The object of the invention is to provide a device of the class hereinabove set out having novel features of advantage and utility.

A form of device in the use of which these objects may be attained is illustrated in the accompanying drawings, in which—

Figure 1 is a view in side elevation of the rear end of an automatic machine showing our improvement applied thereto, with parts broken away to show construction. Fig. 2 is a view, partly in section, of our improved counter as viewed from the left of the device as shown in Fig. 1. Fig. 3 is a detail view on enlarged scale showing a manner of using the disks. Fig. 4 is a detail view on enlarged scale of a portion of the disks illustrating the construction which enables simultaneous operation of both disks. Fig. 5 is a detail top view, scale same as Fig. 2, of the parts shown in said figure, with parts broken away to show construction and the disks being removed.

The invention herein shown and described embodies a device composed of few parts of simple and inexpensive construction and of extreme simplicity in operation.

In the running of automatic machines, sometimes more commonly known as "screw machines" upon which articles of various character are produced by the machine alone and in which constant attendance is not required, it has been found desirable that its amount of product may be determined at any time, and especially when a certain number of articles have been produced that the operation of the machine shall cease without manual aid.

In the use of such machines, without means for determining such results, it becomes necessary that the articles be removed from the receptacle or other location to which they are delivered by the machine and then counted. It frequently happens that this counting operation cannot take place for a considerable length of time, often extending into days, and the customary method in such cases is to stop the machine when it is thought the required number of articles have been approximately made. Counting is then effected as soon as may be and the number of articles to complete the required amount ascertained. The machine is then again set in motion to complete this work. This final operation requires more or less supervision to determine when the work is completed, but the main objection arises from the length of time that the machine remains idle and the loss incident to such cause. This difficulty is increased when a number of these "short orders" each composed of a comparatively few articles, are to be produced by the machine owing to the great length of time that the machine remains idle between the finishing of one order and the beginning of another.

While the invention herein shown and described is especially applicable to a machine of this class, it is not limited to such a structure, as it will be found of value in recording the operation of moving parts of various machines or objects, and in fact, it will be found that the construction of the counter itself has novel features not dependent upon its use with any special device.

The device being especially applicable to a screw machine, such has been selected for the purpose of disclosure of the invention herein, and in the accompanying drawings the numeral 6 denotes a slide support which projects from one end of the frame of the machine, the latter not being shown herein. This support bears slides mounted to reciprocate thereon and effecting different operations of the machine, one of said slides, the feed slide, only being shown herein. The reciprocation of this slide 7 may be effected in any ordinary manner, as by means of a cam 8 on a cam drum 9 engaging with a stud 10 from the slide, only a portion of said parts being shown herein, for the reason that their construction and operation are well understood by those skilled in the art.

A catch 11 is pivotally mounted on the slide to engage a latch 12 also pivotally mounted upon the slide, a rod 13 connecting the latch with a cross-bar 14 suspended from a connection 15, the latter of which extends to the belt shifting mechanism or equivalent mechanism, appurtenant to the machine. All of the parts hereinabove described are of old and well-known construction and further and detailed description is therefore deemed unnecessary herein, as they will be readily understood by those familiar with such devices, it being briefly stated that this stop motion mechanism is ordinarily actuated when the stock is exhausted in the machine.

A plate 16 is secured to the end of the support 6 in any suitable manner, this plate having a barrel 17 formed thereon or secured thereto in any desired manner. This barrel has a bottom at one end with an opening through which the end of a plunger 18 projects, this plunger being enlarged as at 19 forming a shoulder which rests, under certain conditions, against the bottom of the chamber in the barrel. The opposite end of this chamber is closed by a cap 20, preferably a screw cap having an opening 21 in which one end of the plunger 18 has a bearing. A spring 22 is located in the chamber in the barrel, thrusting with one end against the shoulder of the enlargement 19 and with the other end against the cap 20, thus tending to normally hold the plunger with its shoulder against the bottom of the barrel and the end 18 projected therefrom. A screw stud 23 is secured to the plunger 18, preferably to the enlargement 19, this stud projecting through a slot 24 in the barrel and bearing at its outer end a pawl 25. A casing 26 is also formed upon or secured to the plate 16 in any desired manner, in the preferred form of construction and as shown herein the casing, barrel and plate being formed of one piece of metal. This casing has a chamber, one side of which is closed by a cap 27, and the peripheral wall of the casing is open at 28 to permit the entrance of the end of the pawl 25. A plural number of disks are mounted to rotate in this casing, the edges of these disks being toothed or otherwise formed to be engaged by the pawl 25. These teeth or other engaging means are so formed that the pawl will in each of its reciprocating movements engage a successive tooth or other arrangement on one of the disks only, such pawl engaging means, however, being so formed that the pawl will at a certain relative position of the disks engage the means on all.

In the preferred form of construction and as shown herein each of the disks has a hub 29 projecting through an opening 28 in the casing, knobs 30 being secured to these hubs as a means for turning them. Springs 31 are located between each of the knobs and the adjacent wall of the casing to provide sufficient friction to guard against accidental turning movement of the disks or knobs. Each of these disks 32 and 33 is provided with two peripheral surfaces, that of larger diameter having teeth for engagement of the pawl and the surface of smaller diameter bearing characters, as numerals, to indicate the degree of movement or position of a disk relatively to an indicating point.

The spaces between the teeth 34 on the disk 32 are all of the same general form and construction with one exception, and that is, that the space 35 is formed deeper than the other spaces, this depth being of such extent that the pawl 25 is allowed to drop low enough to engage the teeth 36 of the disk 33. The peripheral surface 37 on the disk 32 is unbroken, simply bearing the indicating characters, while the surface 38 on the disk 33 is cut away as at 39, the surface 38 being formed on a flange and the opening 39 extending through this flange. A slot 40 is formed through the cover 27 of the cap, and a pin 41 supported on a latch 42 projects through this slot 40 in position to rest against the peripheral surface or flange 38, the pin being of a size to pass through the opening 39 in the flange. The latch 42 is connected as by a rod 43 with the cross-bar 14 hereinbefore described. It will thus be noted that the disk 33 is given a movement the distance of one tooth at each complete rotation of the disk 32, the latter at the termination of each complete rotation allowing the pawl to engage a tooth on the former to effect this result. With this construction, by arranging the disks relatively one to the other the counter may be set so that the disks 32 and 33 may have any predetermined number of step by step movements, at the completion of which the slot 39 will be located in position so that the pin 41 will enter, allowing the latch 42 to travel upward under the pull of the connection 15 and thus operate the belt shifting or similar mechanism to stop the machine.

The number of teeth upon the disks may be of any relative number, and the characters may be formed in any desired manner to correspond with said teeth, and any means for indicating the exact position of the disks with respect to an indicating point or one with respect to the other, may be employed.

In the form of construction herein shown numerals are placed on the character surfaces 37 and 38, a numeral being placed opposite or appurtenant to each of the teeth.

These numerals are arranged in inverse order, that is, in the rotation of the disks by the pawl 25 the numerals that successively approach the index point are lower than the ones preceding. The disk 33 in the form of device herein illustrated contains one more tooth than the disk 32, the disk 32 having 100 teeth and the disk 33 having 101 teeth. This inverse order of arrangement of the characters on the disks is illustrated in Fig. 3, in which it will be understood that the character zero on the disk 32 indicates the deep tooth and the character zero on the disk 33 is so arranged that when such character arrives at the index character or point denoted by the arrow, and which in this construction is coincident with the point of the pawl, the opening 39 will be in position to receive the pin 41. This arrangement is of especial advantage in setting the counter so that the machine will be stopped when a predetermined number of articles have been made. For instance, as shown in Fig. 3, the counter is set to provide for the making of 557 articles upon the machine, the disk 32 being set with its numeral 57 at the indicating index point, and the disk 33 being set with its numeral 5 opposite the indicating character.

The machine now being started, in each movement of the feed slide 7 to advance the stock in the machine, the pin 18 is moved, actuating the pawl to move the disk 32. As soon as 57 articles have been run off the character zero on the disk 32 will arrive at the index point and in the next reciprocation the pawl engaging the teeth on the disk 33 will give to this disk a one step movement. It will be noted, however, that when the numeral 1 on the disk 33 is reached only 357 articles will have been produced. The purpose of the extra space or tooth on the disk now becomes apparent, as this blank space in the next movement of the disk 33 will account for the fourth hundred, and the next movement of the disk placing the zero point opposite the indicating mark will account for the fifth hundred, at which time the pin 41 will enter the opening 39 and stop the operation of the machine at the completion of the 557 articles. The provision of this extra tooth and blank or undesignated space on the disk 33, which we term the disk of the highest power, it being the farthest removed from the unit disk 32 and denoting the highest series of numbers, enables the determination at a glance as to how many articles remain to be completed by the machine, and an estimate of how long it will take to complete the work, as the characters on the disks give a correct and true reading of the number of articles to be finished.

While only two disks have been shown herein for the purpose of illustration and description of our invention, such invention contemplates the use of any number of disks that may be desired, operated by a single actuator, as the pawl 25, and the arrangement herein shown will readily indicate the formation of the parts to allow the actuator to simultaneously move two or more disks. Each disk, except the first, is given a one step movement on the completion of rotation of the next preceding disk, the deep tooth on the first disk, of course, being cut low enough to enable the pawl to engage the tooth on the last disk, a tooth on each of the intermediate disks being formed to allow such engagement of the pawl.

The term "first" as employed herein to indicate the relative location of the disk, indicates that disk having a step by step movement imparted by each reciprocation of the pawl, and the terms "preceding", "succeeding", "first", "last", etc., refer to the disks in the order which they bear with respect to the first disk and running outward therefrom.

It will be understood that the characters may be of any desired form and order upon the disks, and that the general construction and arrangement of the several parts may be departed from to a greater or lesser extent without avoiding the invention, and we do not therefore limit ourselves to the arrangement herein shown and described.

We claim—

1. A plural number of disks each having a step by step movement and the disk of the highest power having one more movement than the other disks to complete its rotation, means on said disks for indicating the degree of movement of each, an actuator mounted to impart step by step movement to each of the disks at the end of a complete rotation of the preceding disk, and means for operating the actuator.

2. A plural number of disks each having means for indicating its degree of movement, and the disk of the highest power having an extra undesignated indicating means absent from the other disks, an actuator mounted to impart step by step movement to each of the disks at the end of a complete rotation of the preceding disk, and means for operating the actuator.

3. A plural number of disks each having characters consecutively arranged to indicate the degree of movement, and the disk of the highest power having an undesignated space between its highest and lowest character, an actuator mounted to impart step by step movement to each of the disks at the end of a complete rotation of a preceding disk, and means for operating the actuator.

4. A plural number of disks each having a tooth for engagement of an actuator and each provided with means for indicating its degree of movement, the disk of the highest power having one more tooth than the other disks, an actuator arranged to engage the teeth of said disks to impart step by step movement thereto at the end of a complete rotation of a preceding disk, and means for operating the actuator.

5. A plural number of disks each having teeth for engagement of an actuator and provided with means for indicating its degree of movement, the disk of the highest power having one more tooth than the other disks and each disk having indicating characters appurtenant to each tooth, the disk of the highest power having an undesignated space opposite said extra tooth, an actuator arranged to engage the teeth of said disks to impart step by step movement thereto at the end of a complete rotation of a preceding disk, and means for operating the actuator.

6. A plural number of disks each having characters to designate its degree of movement and the disk of the highest power having an extra undesignated space and a single disk having a slot to receive a member of a stop motion mechanism, a member of a stop motion mechanism mounted appurtenant to said disk, an actuator mounted to impart step by step movement to each of the disks at the end of a complete rotation of a preceding disk, and means for operating the actuator.

7. A plural number of disks each having means for indicating its degree of movement and the disk of the highest power having an extra undesignated space and also a slot to exclusively receive and permit operation of a member of a stop motion mechanism, the member of a stop motion mechanism mounted appurtenant to said disk, an actuator mounted to impart step by step movement to each of the disks at the end of a complete rotation of a preceding disk, and means for operating the actuator.

8. A plural number of disks each having means for indicating its degree of movement and the disk of the highest power having an extra indicating means absent from the other disks and said disk of the highest power also having means to receive a member of a stop motion mechanism said means being relatively located with respect to said extra indicating means, an actuator mounted to impart step by step movement to each of the disks at the end of a complete rotation of a preceding disk, and means for operating the actuator.

9. A plural number of disks each having characters to indicate its degree of movement and the disk of the highest power having an undesignated space and said disk of the highest power also having means to receive a member of a stop motion mechanism, said means being located with respect to said undesignated space, the member of a stop motion mechanism operatively mounted with respect to said disk, an actuator mounted to impart step by step movement to each of the disks at the end of a complete rotation of a preceding disk, and means for operating the actuator.

10. A plural number of disks each having teeth by means of which movement is imparted thereto and the disk of the highest power having one more tooth than the other disks, said disk of the highest power also having a slot located with respect to said extra tooth, an actuator mounted to impart step by step movement to each of the disks at the end of a complete rotation of a preceding disk, and means for operating the actuator.

11. A plural number of disks each having teeth to indicate its degree of movement and the disk of the highest power having an extra tooth with an undesignated space opposite said tooth, said disk of the highest power also having a slot located with respect to said undesignated space, a member of a stop motion mechanism arranged to enter said slot, an actuator mounted to impart step by step movement to each of the disks at the end of a complete rotation of a preceding disk, and means for operating the actuator.

12. A casing containing a plural number of disks mounted side by side and arranged to receive a step by step movement of each disk at the end of a complete rotation of a preceding disk and the disk of the highest power having an extra undesignated space, a barrel mounted on the case, a plunger mounted in said barrel and adapted to have reciprocating movement, and an actuator mounted on the plunger and arranged to engage said disks.

13. A casing having a circular chamber, a plural number of disks mounted in said chamber, each having means to indicate its degree of movement and each provided with means for receiving a step by step movement at the end of a complete reciprocation of a preceding disk and the disk of the highest power having an extra undesignated space, a barrel mounted on the case, a plunger mounted in the barrel to have reciprocating movement therein and arranged to receive movement in one direction, means for moving the plunger in the opposite direction, and an actuator borne by the plunger and arranged to engage each of the disks.

14. In combination with a reciprocating member of a power-operated machine, a number of disks each having teeth to be engaged by a pawl, a pawl arranged to engage the teeth of each of the disks to impart a step by step movement thereto at the end of each complete rotation of a preceding disk and the disk of the highest power having an extra undesignated space, a plunger bearing said pawl and arranged to be operated by the reciprocating movement of said member of the machine, a flange projecting from the side of one of the disks having an opening, and a stop motion mechanism having a part bearing against said flange and arranged to pass through said opening.

15. In combination with a reciprocating member of a power-operated machine, a plural number of disks each arranged to receive a step by step movement at the end of a complete rotation of a preceding disk and the disk of the highest power having an extra undesignated space, an actuator arranged to engage each of the teeth of each disk and to be operated by the reciprocating movement of said member, a flange projecting laterally from the side of the last disk having an opening, and a stop motion mechanism having a member resting against said flange and arranged to pass through said opening.

16. A plural number of disks, means on said disks for indicating the degree of movement of each, the disk of the highest power having an extra undesignated indicating space, means located on a single disk engaged to operate a member of a stop motion mechanism, a member of a stop motion mechanism coöperatively located with respect to said disk, an actuator mounted to impart step by step movement to one of said disks, and means for operating the actuator.

17. A plural number of disks, indicating means arranged in progressive series upon the disks to indicate their degree of movement, the disk of the highest power having an extra undesignated indicating space, means on the disk containing the highest series of indicating characters, said means being arranged to operate a member of a stop motion mechanism, a member of a stop motion mechanism coöperatively located with respect to said disk bearing the highest series of indicating characters, an actuator mounted to impart step by step movement to one of said disks, and means for operating the actuator.

18. A plural number of disks each having characters arranged in progressive series upon the disks to indicate the degree of movement of the disks, the disk of the highest power having an extra undesignated indicating space, the disk containing the highest series of indicating characters having a slot to receive a member of a stop motion mechanism, a member of a stop motion mechanism mounted to impart step by step rotation to each of the disks at the end of a complete rotation of a preceding disk, and means for operating the actuator.

WALTER B. PEARSON.
ERNEST R. SEWARD.

Witnesses for Walter B. Pearson:
  HELEN S. PEARSON,
  L. V. BAIN.

Witnesses for Ernest R. Seward:
  GEORGE E. WITHERELL,
  CARL FRED WOLF.